United States Patent [19]
Bart

[11] 3,947,989
[45] Apr. 6, 1976

[54] FISHING EQUIPMENT
[76] Inventor: Philip D. Bart, 46 Spinning Wheel Lane, Tamarac, Fla. 33313
[22] Filed: Dec. 23, 1974
[21] Appl. No.: 535,860

[52] U.S. Cl. .............. 43/42.09; 43/42.22; 43/42.28; 43/42.31; 43/42.33; 43/42.36
[51] Int. Cl.² ........................................ A01K 85/00
[58] Field of Search ............ 43/42.35, 42.33, 42.22, 43/42.28, 42.09, 42.1, 42.39, 42.31, 42.36, 42.48

[56] References Cited
UNITED STATES PATENTS

| | | | |
|---|---|---|---|
| 2,242,965 | 5/1941 | Adams | 43/42.39 |
| 2,573,592 | 10/1951 | Nickel | 43/42.33 |
| 2,752,721 | 7/1956 | Denny | 43/42.33 |
| 3,359,674 | 12/1967 | Strumor | 43/42.22 |

Primary Examiner—Warner H. Camp
Attorney, Agent, or Firm—Daniel M. Rosen

[57] ABSTRACT
A fishing lure or teaser that is constructed with a hollow cylindrical body and a shaped front end portion. The cylindrical body includes a removable plug positioned opposite the shaped end portion and held in place by means of a retaining shaft or other means. The plug includes means for retaining a plurality of streamers. The hollow cylinder includes a series of spaced ribs along the length thereof protruding inwardly. Positioned internally against the ribs is a sheet of light-controlled film which exhibits a varied color characteristic in accordance with light incident thereon. The hollow cylindrical body is fillable with liquid such as water for effecting the buoyancy thereof while in use and transmits the reflective index and qualities of the light-controlled film more effectively. The retaining shaft includes means for fixably attaching a hook or like member for securing an attracted fish.

The shaped front portion of the lure is designed to give the lure a running appearance darting to and fro, and up and down, by being pulled in the water to simulate the illusion of a moving fish. The motion changes the color of the light-controlled film and is visible to the attacking fish.

9 Claims, 11 Drawing Figures

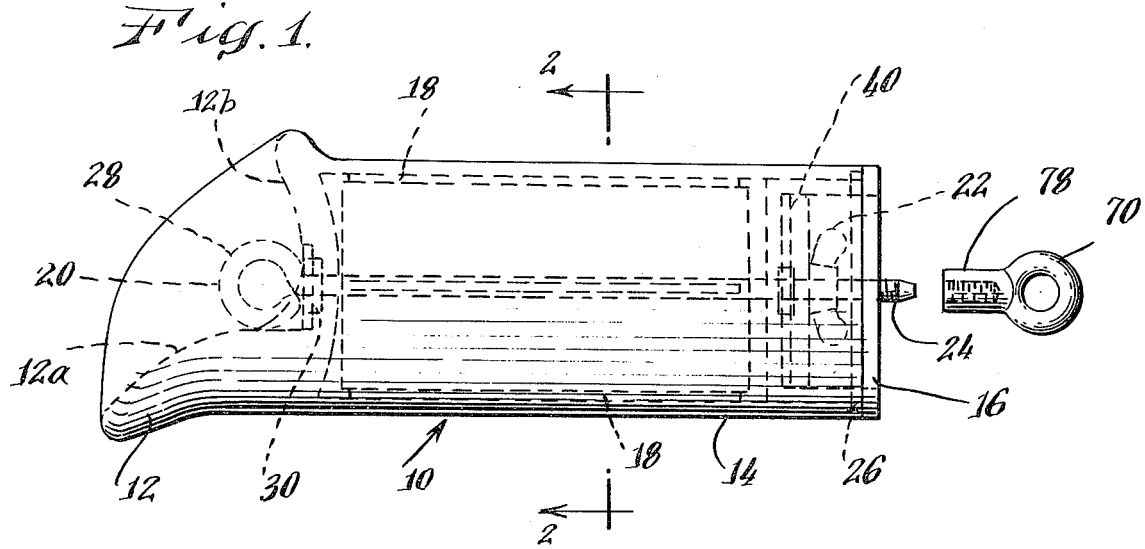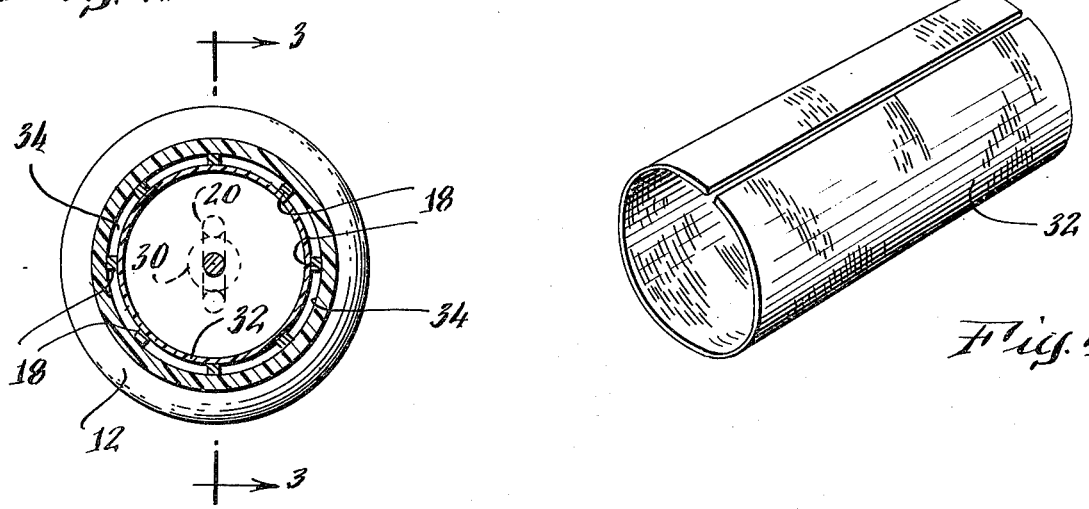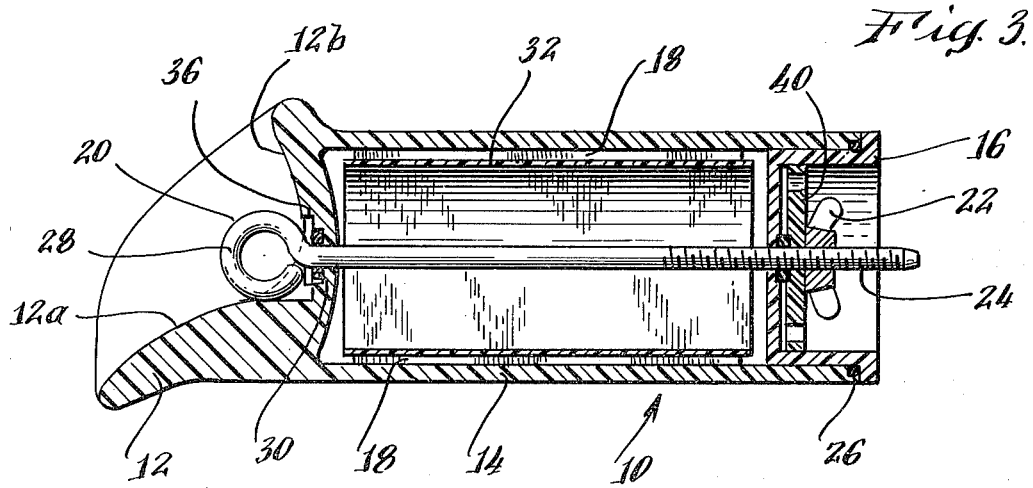

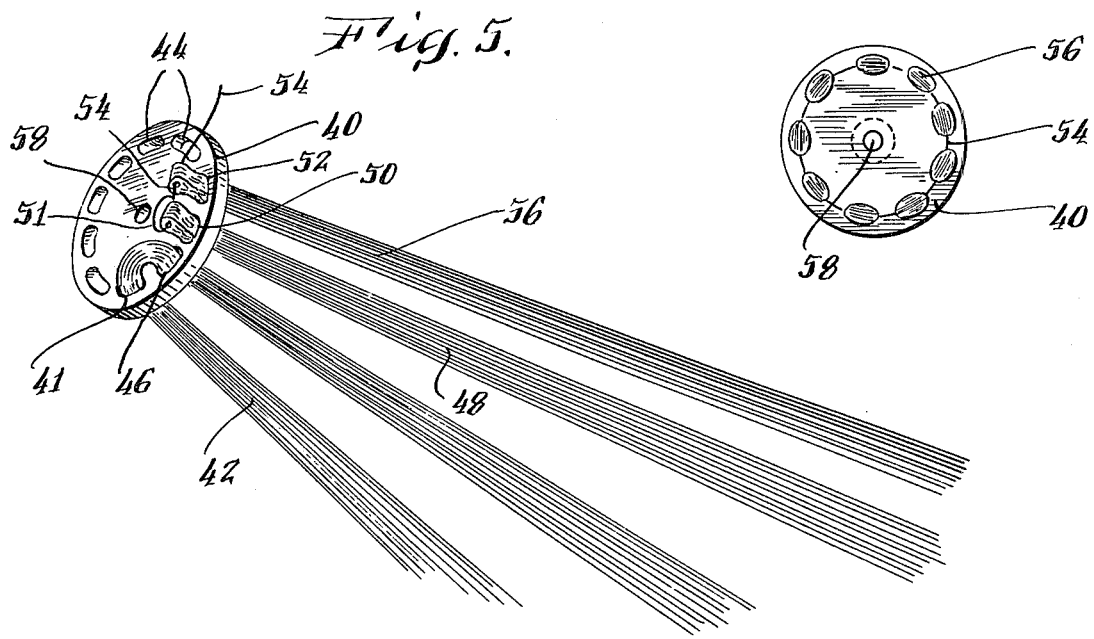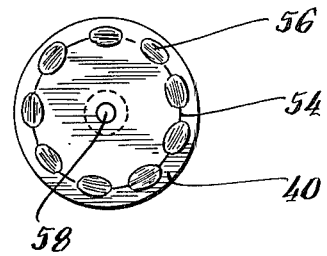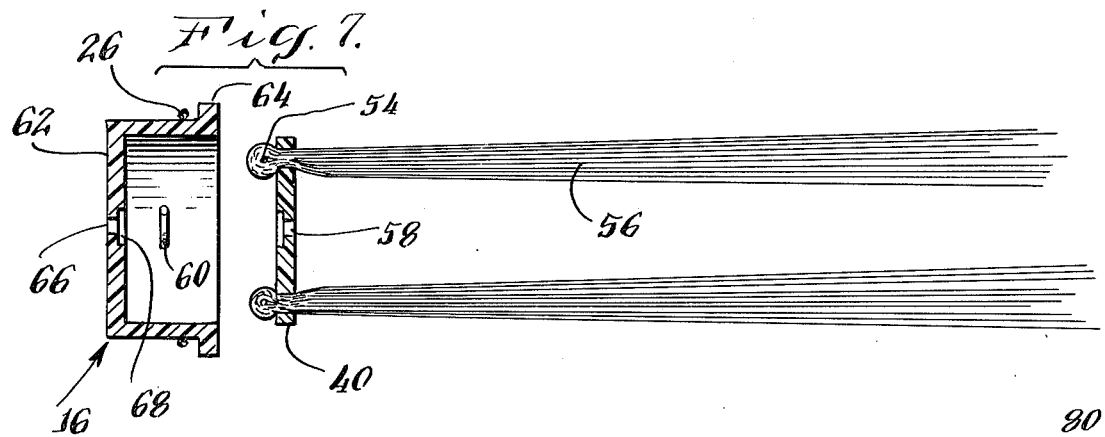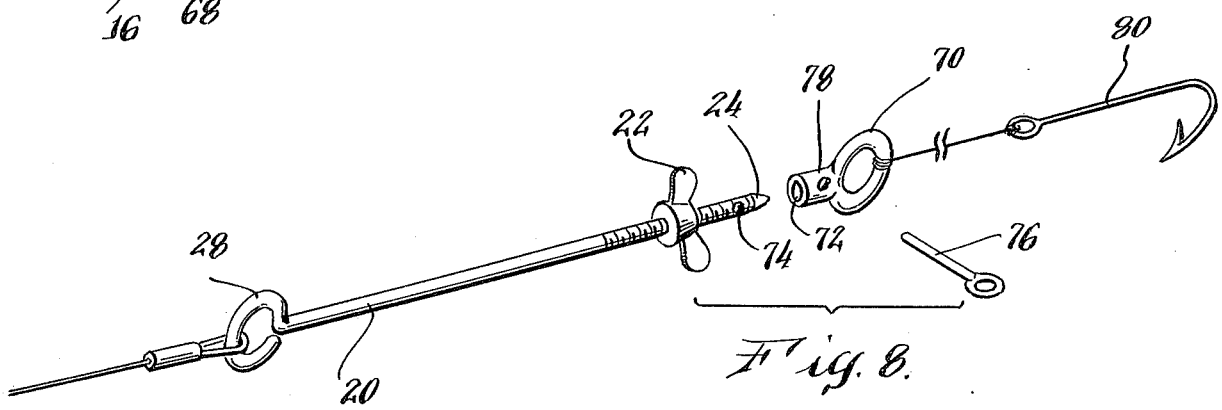

FISHING EQUIPMENT

The present invention relates to fishing equipment, and more particularly to lures utilized in the attracting and securing of game fish.

In the area of sport and commercial fishing, particularly in the securing of the larger game fish, such as blue marlin, sailfish, white marlin, tuna, dolphin, and other similar type of fish, the use of an effective lure or teaser is of extreme importance. Many of the lures which are conventionally available are quite restricted and limited in their utility. In addition, it is known that the most effective type of lure is that of the living bait, both in terms of color and appearance and in terms of movement and approximation of reality.

In addition, it is often necessary for the effective securing of large game fish for the sport and commercial fisherman to carry with him a large variety of lures and teasers, thereby giving rise to great expense, inconvenience and the necessity of a large amount of equipment. Equipment on a limited area such as a vessel employed in commercial and sport fishing is necessarily limited due to space and capacity.

Accordingly, it is the principal object of the present invention to provide an improved fishing lure and teaser.

It is another object of the present invention to provide a fishing lure and teaser that will accurately reproduce the movement of a bait fish through water.

It is another object of the present invention to provide a fishing lure and teaser that will possess light qualities accurately simulating the various color ranges of bait fish. Bait fish change color while under attack from their natural predators.

It is a still further object of the present invention to provide a lure that may be varied in accordance with the type and characteristic of fish desired to be attracted and sea conditions during fishing.

It is a still further object of the present invention to provide a lure whose buoyancy qualities may be altered as desired.

The foregoing objects are achieved by means of a fishing lure or teaser that is constructed with a hollow cylindrical body and a shaped front end portion. The cylindrical body includes a removable plug positioned opposite the shaped end portion and held in place by means of a retaining shaft or other means. The plug includes means for retaining a plurality of streamers. The hollow cylinder includes a series of spaced ribs along the length thereof protruding inwardly. Positioned internally against the ribs is a sheet of light-controlled film which exhibits a varied color characteristic in accordance with light incident thereon. The hollow cylindrical body is fillable with liquid such as water for effecting the buoyancy thereof while in use and transmits the reflective index and qualities of the light-controlled film more effectively. The retaining shaft includes means for fixably attaching a hook or like member for securing an attracted fish.

The shaped front portion of the lure is designed to give the lure a running appearance darting to and fro, and up and down, by being pulled in the water to simulate the illusion of a moving fish. The motion changes the color of the light-controlled film and is visible to the attacking fish.

The foregoing objects and brief description of the present invention as well as other advantageous features, objects and embodiments will become more apparent from the following more detailed description and appended drawings wherein:

FIG. 1 is a perspective view of the lure;

FIG. 2 is a cross-sectional view through the center of the cylinder of the lure;

FIG. 3 is a cross-sectional view of the front section of the lure;

FIG. 4 illustrates the light-controlled film material inserted into the lure;

FIG. 5 illustrates the manner wherein streamers are inserted into a retaining member;

FIG. 6 illustrates the manner wherein the streamers are retained;

FIG. 7 illustrates the tail assembly wherein the streamers are inserted into the plug for attachment to the cylinder;

FIG. 8 illustrates the manner wherein the hook is attached to the retaining shaft.

Figure 9A:
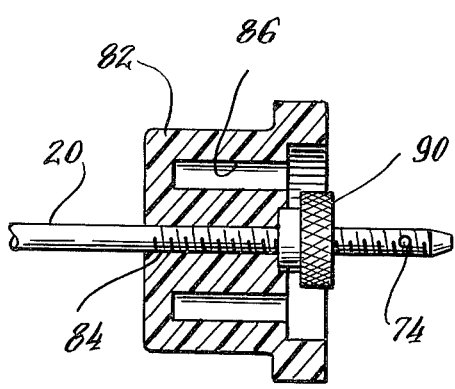
FIGS. 9a, b and c illustrate an alternative tail assembly.

Referring now to the figures, the general configuration of the lure is shown in FIG. 1. The lure 10 includes three major portions. The first portion is a head 12 with a curved front end having a lower forwardly protruding lip-like portion 12a curving into an upper less sloping portion 12b. The body portion 14 is a round cylindrical hollow member which is terminated in turn by the plug 16. Positioned along the body 14 is a series of internally protruding ribs which are radially spaced about the inner circumference of the circle and run along it substantially the entire length except for a spaced portion adjacent to the end incorporating the plug 16. The head and body are connected, either by being formed as separate components and adhesively or otherwise secured together or, preferably, molded as a single unit by means of conventional injection molding techniques or the like.

The plug is maintained in the cylindrical body by means of a retaining shaft 20 which runs down the center of the lure 10 and is secured by means of a wing nut or other fastener 22 threaded upon the threaded end portion 24 of the central shaft. The internal section of the body 14 is rendered water-tight by means of an O-ring seal 26 sealing the plug to the body. The far end of the retaining shaft 20 includes an eyelet portion 28 for securing a snap swivel or fishing line or the like and is in turn employed to apply force to a further O-ring seal 30 for sealing the shaft against the front running face 12 of the lure 10.

As shown in FIG. 2, the internal ribs 18 extend radially about the entire circumference of the body 14 and protrude inward. The ribs 18 are used to space a light-controlled film indicated generally as 32 and shown in FIG. 4 which is curled around to form a complete closed cylinder and inserted into the hollow cylindrical body 14. The film has a tendency to uncurl due to its natural resilience and thus lies flat against the ribs 18. The film however is spaced from the interior wall 34 of the body 14, thereby maintaining a slight gap between the film and the interior wall. The purpose and function of this gap will be explained in further detail below.

The light-controlled film which is manufactured commercially by the Minnesota Mining and Manufacturing Company of St. Paul, Mn., is available in several configurations, with a lineal grain such as shown in FIG. 4 which runs along the length of the long axis of the body 14, or with a transverse grain, running in a direction transverse to the central shaft of the body 14.

The effect of either longitudinal or transverse grain will be to produce different light-controlled effects of the film in accordance with the random movement of the lure. The nature of the film is to exhibit a color variation when struck by instant light. A light-controlled film possessing as many as five different colors in accordance with the light incident thereon is available from the Minnesota Mining & Manufacturing Company and is utilized in conjunction with the lure in the present invention for presenting a varied colored effect. This color effect is further emphasized and highlighted by the presence of water within the body. By spacing the film from the interior sidewalls 34 of the cylindrical body 14, a light effect is obtained without any blotches caused by trapped air bubbles or by direct contact of the film to the wall. The effect is highlighted further when the cylindrical body 14 is filled with water, the presence of water between the sidewall and the film providing a clear unmarked purity of color.

The light-controlled film 32 has a significant effect insofar as its usage is concerned in conjunction with the lure of the present invention. It is significant in that the light-controlled film is not reflective but actually possesses a variation of color as light strikes it from different angles. This is important because fish will be attracted to light varying colors and a light varying color effect is not produced by merely reflective films.

The use of a hollow cylindrical body 14 with removable plug 16 further offers the opportunity of filling the body with other means or mechanisms for catching fish. Such devices might include lead sinkers for additional weight, sparkling or reflective material for additional attraction, a portable light source, and the like.

Referring to FIG. 3, a cross-sectional view of the head portion 12 of the lure is illustrated. The particular shape of the head 12 is designed to have a flow control while in the water which will affect the manner in which the teaser moves as the water strikes it. Thus, the teaser will move in the direction dictated by the general contour of the inside face of the head portion 12. If the protruding lower part 12a of the head 12 is pointed down towards the ocean floor, the lure will tend to dive. If the protruding part 12a points to the left or right, the teaser will also tend to move in that direction. Since the lure tends to rotate freely at the end of the fishing line attached to the eyelet 28, the motion of the head through the water will give the impression of a fish having darting movements. Thus, the movement of the lure as it is being pulled through the water by the fishing line simulates accurately the motion and movement of a live fish, as well as undergoing changes in color.

As further shown in FIG. 3, a cup-shaped portion 36 is included within the face portion of the head 12. This cup-shaped portion 36 is employed for retaining trapped air. During the running of the lure, the head will surface from time to time causing air to become trapped within this cup-shaped portion 36. As the lure reenters the water, the release of air from the trapped portion will give the impression of released air bubbles such as might occur when a fish submerges after passing through the surface area.

Referring now to FIGS. 5 through 7, the tail assembly is shown in greater detail. The prime advantage of the tail assembly is that it allows for quick removal and replacement of the tail with other types of tails which may be employed for attracting different types of fish. The purpose and function of the tail is not only to serve as a portion of the plug for sealing the end of the cylinder, but also for providing a streamer in accordance with the type of fish desired to be attracted.

By way of construction, and referring more specifically to FIG. 5, there are two alternative techniques which may be employable for inserting streamers into the tail assembly. For ease of illustration, both techniques are shown on a single disc, although it will be understood that only one or the other technique is employed on a single disc to insert the streamers. In each technique the use of a disc 40 is employed. A series of apertures 44, 46, exist circumferentially about the periphery of the disc 40. The apertures are generally oval in shape with the long axis of the oval paralleling the circumference of the disc 40. In the first technique, streamers 42 are inserted into aperture 44 and down through adjoining aperture 46. This is repeated with each pair of adjoining apertures until the set of streamers is completed.

In a second and preferred embodiment, the set of streamers 48 are inserted through the aperture 50, such that a loop 52 is created in the end of the streamers. To the end of this loop is attached a suitable tieing device, such as the braided nylon cord 54 which may be knotted around the loop 52 formed in the streamer 48. Now the next adjoining streamer 56 is inserted into the next adjoining aperture 52 and a similar loop formed. This time however the braided nylon cord 54 is merely passed through the center of the loop. This technique continues until all the apertures are filled, as shown in greater detail in FIG. 6. Each time the loop is formed in an adjacent aperture, the braided nylon cord is passed therethrough and the streamers are then pulled tight against the cord. Upon completion, the strand 54 may be knotted or otherwise secured, as by adhesive, to form a circle around the upper part of the disc 40 which prevents any of the streamers 56 from being pulled through the disc. The streamers can then be sealed to the disc by applying a clear coating of epoxy to the upper surface of the disc, streamers and braided nylon cord. By utilization of oval apertures, a spreading effect is realized with the streamers as they are inserted into position in the respective apertures. The streamer materials may be constructed of a nylon, polyethylene, polypropylene, or any suitable synthetic fibrous material. It is preferred that the material have a diameter averaging approximately 5/1,000ths of an inch in any desired cross-section.

Referring now to FIG. 7, the assembled disc 40 is provided with a central aperture 58 and along with an O-ring 60 press-fit into the interior section of the plug 62. The plug 62 corresponds to plug 16 shown in FIG. 1. The O-ring 26 which corresponds to the O-ring 26 shown in FIG. 1 is positioned around the flange portion 64 surrounding the lower peripheral area of the plug. A further aperture 66 is provided in the base of the plug to allow the retaining shaft 20 to pass therethrough. The O-ring 60 can be made to fit within a raised molded area 68 and can be formed around the interior portion of the aperture 66 within the plug base 62. The streamers then stream out from behind the plug which is inserted with its aperture 66 facing into the interior of the cylinder 14 as shown in FIG. 1.

Referring now to FIG. 8, the retaining shaft 20 is shown in greater detail. As illustrated, the shaft is an elongated, corrosion-resistant element, having a threaded end portion 24 to which a wing nut or other fastener 22 may be affixed. For purposes of holding the hook, an eyebolt 70 is provided. The end portion 72 of the eyebolt has an interior threaded segment which may be threaded down onto the threaded area 24 of the shaft 20. For further security, the end of the shaft 20 may include a further aperture 74 to which a cotter pin 76 may be inserted. The cotter pin 76 is inserted through an aperture 78 found on the eyebolt 70 which is aligned with the aperture 74 at the end of the shaft 20. Insertion of the cotter pin 76 secures the eyebolt 70 to the end of the shaft 20 and prevents the eyebolt 70 from becoming unscrewed due to the motion caused by the engagement of the fish onto the hook. The hook 78 may be attached by means of suitable leader 80 to the eyebolt 70 for that purpose.

All of the parts described herein, such as the lure body, disc, end plugs, may be of a high impact plastic material produced by conventional injection molding techniques. It is preferred that the retaining shaft 20 be constructed of any corrosion-resistant metal, such as brass, bronze, stainless steel, monel or any similar material resistant to salt water corrosion or other atmospheric effects encountered in fishing environments.

Figure 9B:
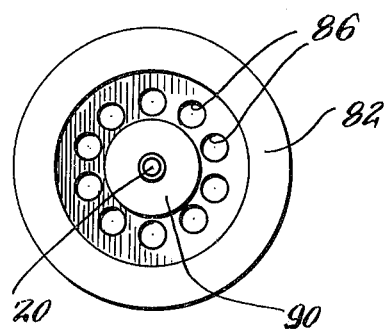
Figure 9C:
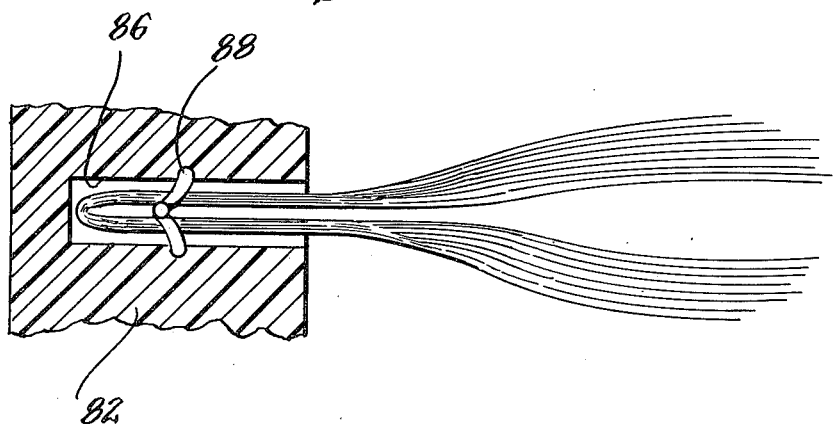

As a further alternative to the tail assembly illustrated, a further version is shown in FIGS. 9a, 9b and 9C. As shown in FIG. 9a the tail plug 82 is formed as a solid plug having a central aperture 84 for accommodating the central retaining shaft 20 which runs down the center of the lure 10. Additionally a plurality of circumferentially spaced apertures 86 are provided, shown in FIG. 9b, penetrating to a depth of approximately three-fourths of the way into the plug. When the streamers are to be inserted, they are merely folded over and inserted down into an aperture as shown in greater detail in FIG. 9c and fixed in position by means of an elongated staple 88 which becomes partially bent when inserted into the aperture 86. It should be noted that the streamer insertion using the staple 88 is a technique conventional in the art of manufacturing bristle containing structures, such as hair brushes and the like. Other methods of insertion and fixation may be employed.

A further alternative for mounting the central shaft 20 through the body of the lure is also shown in FIG. 9a. In this configuration, a lure is mounted on to the plug 84 in the same manner shown in FIG. 3. However, instead of utilizing the wing nut 22 as shown in FIG. 8, a knurled nut 90 may be threaded directly onto the end portion of the shaft 20, which may be threaded in the same manner as shown in FIG. 8, and is thus secured to the lure body by finger tightening in the same manner as shown in FIG. 3 for the wing nut 22. Further, it is possible to employ the aperture 74 at the end of the central shaft 20 as an eyelet for directly attaching the hook 80 and its associated leader line. In this case, it is not necessary to use the eyelet 70 and associated pin 76.

Additionally, it is preferable when employing the light control film 32 to configure the edges thereof in a manner such that the entire side wall of the lure body is covered by such film. Thus, referring to FIG. 3, the edges of the film 32 may be extended merely by means of shaping the edges thereof to correspond to the curved portion adjacent the head of the lure body so as to provide full coverage of the film along the transparent wall of the lure body.

In use, any of various tail assemblies may be employed in accordance with the type of fish desired. The unit may be filled completely or partially with water in order to provide the proper buoyancy levels necessary for attracting the type of fish indicated by means of the specific tail employed. With the lure completely filled with water, it will have a tendency to run lower beneath the surface, whereas with the device partially filled with water it will have a tendency to run higher or towards the surface. Thus, the lure may be employed to attract different types or species of fish by combining specifically colored tails with a buoyancy factor, as well as with the varying colors offered by the use of the light-controlled film. Thus, the use of the present invention offers the advantage of having interchangeability as well as variation in the buoyancy characteristic, all with a single type of construction Other variations and alternatives within the spirit and scope of the invention will be evident to one skilled in the art. It will be apparent that various combinations of film colors, buoyancy factors, and tail sections may be employed with this single device for attracting various types and species of fish.

Whereas the invention has been illustrated and described in conjunction with several specific embodiments, it will be understood that such description is illustrative only and not restricted nor in any way intended to be limited thereto, it being further understood that many changes, variations, modifications, and additions and deletions will be evident to one skilled in the art without veering from the spirit and scope of the present invention desired to be protected.

What is claimed is:

1. In a fishing lure, the combination comprising a head, a body and a tail, said head including a raised circumferential outer peripheral portion forming a cup shape and having a shaped profile with a forwardly protruding lower portion curving into an upper less sloping portion, said body being connected to said head, said body being hollow, said tail member further comprising a support means, a plurality of streamers attached to said support means, and means for removably securing said support means to said head through said body.

2. The combination of claim 1 wherein said body is transparent and includes a sleeve of light-controlled film positioned inside said hollow body.

3. The combination of claim 1 wherein said body is transparent and includes a series of parallel spaced inwardly protruding elongated rib members, and a sleeve of light-controlled film placed into said body and spaced from the inner walls thereof by said ribs by a distance sufficient to prevent contact between said film and said inner walls.

4. In a fishing lure, the combination comprising a water sealed enclosed hollow transparent member, said hollow member being substantially cylindrical and including a plurality of inwardly extending ribs spaced about the inner circumference of said hollow member and a sleeve of light-controlled film concentrically positioned within said hollow member and spaced from the internal wall of said hollow member by said ribs by a distance sufficient to prevent contact between said film and said internal wall, and means for attaching fishing lure for securing said lure to said line.

5. In a fishing lure, the combination comprising a head, a body and a tail, said head including a shaped profile having a forwardly protruding lower portion and a forwardly protruding upper portion, said upper portion having less of a forward protrusion than said lower portion, said upper and lower portions both formed of a cup shaped member, said body being a hollow cylinder having a series of inwardly protruding ribs extending along a portion of the length thereof, a sleeve of light-controlled film positioned concentrically within said body and spaced from the wall thereof by said ribs, said tail being removably secured to said body and including a plurality of streamers connected thereto and including a central aperture, a support means mounted through said head, body and tail aperture for holding said tail to said body, said support means including an elongated rod having means located at either end thereof for securing a fishing line and fish securing means, respectively, thereto.

6. The lure of claim 1 wherein said tail member and support means includes a plug sealing said hollow body and having a plurality of circumferentially spaced nonperforating apertures about a central perforating aperture, said plurality of streamers affixed in each of said nonperforating apertures, and a securing supporting shaft, said shaft sealingly affixed at one end thereof to said head, traversing said hollow body, and sealingly affixed at the other end thereof through said central perforating aperture of said plug, said securing shaft adapted to be connected, at opposing ends thereof, to a fishing line.

7. The lure of claim 1 wherein said hollow body contains therein a shifting weight.

8. The lure of claim 7 wherein said shifting weight is achieved with a partial filling of said body with a fluid.

9. The lure of claim 7 wherein said shifting weight is achieved with a partial filling of said body with a solid.

* * * * *